June 9, 1936.                C. M. TUTTLE                 2,043,908
             METHOD AND APPARATUS FOR DETERMINING CONTRAST
                          Filed Nov. 23, 1933
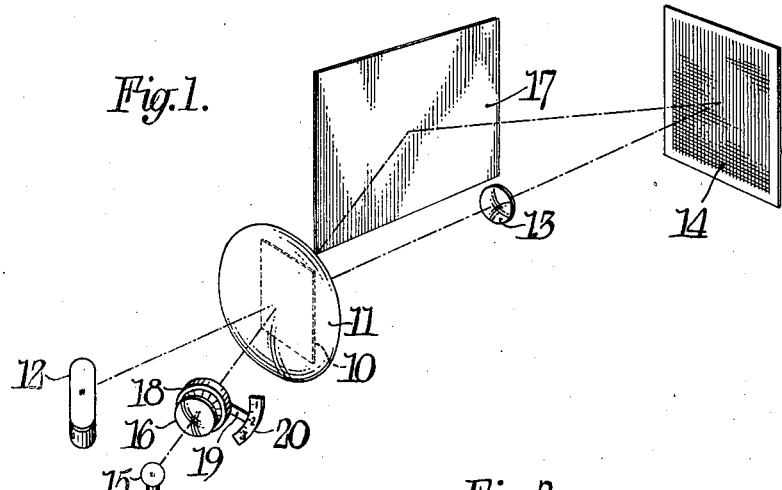
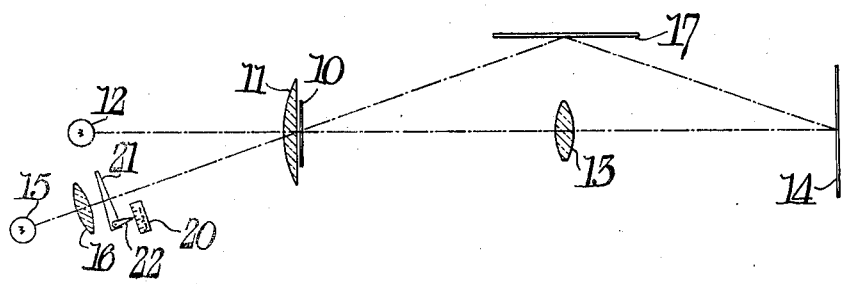
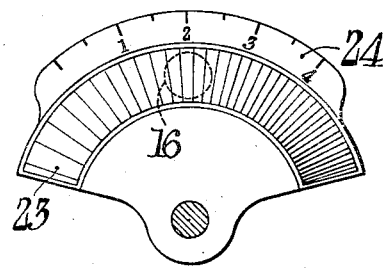
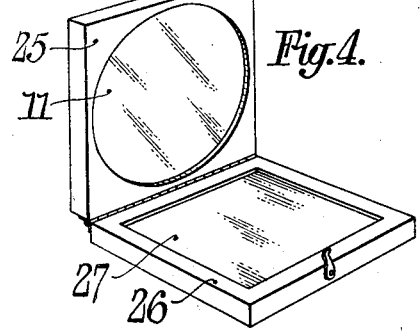
Inventor:
Clifton M. Tuttle
Attorneys Patented June 9, 1936

2,043,908

UNITED STATES PATENT OFFICE 2,043,908

METHOD AND APPARATUS FOR DETERMINING CONTRAST

Clifton M. Tuttle, Rochester, N. Y., assignor to Eastman Kodak Company, Rochester, N. Y., a corporation of New York Application November 23, 1933, Serial No. 699,368

3 Claims. (Cl. 88—14)

This invention relates to photographic printing and particularly to a process and apparatus for ascertaining the contrast of a negative to be printed so that the proper grade of sensitive paper may be chosen which will result in the most desirable print.

It is well known that more satisfactory prints may be obtained from negatives differing in contrast if different grades of paper are employed, and in amateur photo finishing it is generally considered that four grades of paper will satisfactorily meet this requirement. It is an object of this invention to furnish a method and apparatus whereby the proper grade of paper to be used is easily ascertainable.

This object is obtained by noting the amount of diffused light necessary to render negligible the contrast of an image of the negative under consideration. This effect is obtained by forming on a suitable screen a light image of the negative and modifying this image with extraneous light which has passed through the negative; as the intensity of the extraneous light is increased the contrast in the projected image is decreased and a point will be reached where the contrast of the projected image is negligible. Since the intensity of the extraneous light needed to so modify the image is a function of the negative contrast this intensity may be used to obtain an indication of the proper grade of paper which should be used in printing the negative.

The invention consists of the method of measuring contrast and of the apparatus for carrying out this method.

The invention will be readily understood from the following description when read in connection with the accompanying drawing in which the same reference characters indicate the same elements throughout.

Fig. 1 is a perspective view diagrammatically showing one suitable arrangement for practicing my invention.

Fig. 2 is a plan view of the arrangement of Fig. 1 and shows an alternative arrangement for modifying the extraneous light.

Fig. 3 is a view of another form which the light modifying device may take.

Fig. 4 shows one suitable means for masking the negative and supporting it in proper position.

While the apparatus and arrangement particularly shown and described are operative embodiments of my invention it is to be understood that many modifications are contemplated and that the specific structures shown are merely illustrative of the functions to be performed.

The arrangements shown in the drawing have been made largely diagrammatic and consist of only those features necessary to a complete understanding of the invention, the various supporting structures and casings may assume various shapes and forms and will occur to anyone skilled in the art and form no part of my present invention, accordingly such structure has not been shown since it would serve only to obscure rather than disclose the invention.

As shown in Figs. 1 and 2 a negative 10 whose contrast is to be determined is placed behind a condenser lens 11 and illuminated by a suitable lamp 12. The condenser lens 11 images the lamp 12 in a projection lens 13 which in turn images the negative 10 on a suitable screen 14 which preferably is provided with a diffusing surface. It will be realized that the arrangement just described is merely one suitable way of projecting an image of the negative 10 on the diffusing screen 14.

In order to illuminate the screen 14 with extraneous light a second lamp 15 may be arranged to cast a diffused beam of light onto the screen 14 without passing through the projection lens 13 in the following manner:

A condenser lens 16 collects the light from the lamp 15 and directs it through the condenser lens 11 which images the lens 16 on the screen 14 after reflection at a mirror 17 or other suitable means for directing the light onto the screen 14. For varying the intensity of the extraneous light falling on the screen 14 any suitable light modifying device may be employed and is shown in Fig. 1 as comprising an iris diaphragm 18, the operating lever 19 of which may move over a scale 20 which is calibrated in terms of the grade of paper which should be used. Obviously the scale 20 may be calibrated in terms of contrast.

In Fig. 2 a neutral density wedge 21 is employed to modify the extraneous light. This wedge 21 may be provided with a pointer 22 which cooperates with the scale 20 to indicate contrast or the grade of paper to be used.

In Fig. 3 is shown a modified form of density wedge 23 which carries a scale 24 adapted to indicate the movement of the wedge relatively to any fixed point.

The negative holder shown in Fig. 4 comprises a support 25 carrying the condenser lens 11 and hinged to a frame 26 provided with a glass 27 upon which the negative may be placed. The frame 26 acts as a mask for the negative and for smaller negatives black paper masks may be used as is well known.

In practicing the method of my invention the negative 10 to be tested is placed in the frame 26 which is then closed to position the negative behind the condenser lens 11. An image of the negative is projected on the screen 14 and the extraneous light from the lamp 15 is varied in intensity until the contrast of the projected image is negligible at which time the position of the light modifying means indicates the grade of paper which should be used.

It should be noted that the extraneous light used to reduce the image contrast passes through the negative being measured and therefore the average density of the negative does not enter into this measurement.

It is to be understood that in all of the figures I have purposely made the showing largely diagrammatic so that the optical principles which constitute the real features of my invention may be clear. It is obvious that the mechanical and structural details may follow standard practice in this art and a complete showing thereof would merely obscure the actual invention. The present showing is however sufficient for anyone skilled in the art to make and use the invention.

Wherever the term "negative" is used in the description or claims, I mean thereby any image bearing photographic record, the contrast of which it is desired to determine.

It is apparent that many modifications of my invention will occur to those skilled in the art without departing from the scope of my invention as set forth in the appended claims:

What I claim as new and desire to secure by Letters Patent of the United States is:—

1. The method of measuring the contrast of a photographic negative which comprises forming an image of the negative on a light diffusing surface, directing extraneous light through the negative and onto the image on said diffusing surface, varying the intensity of the extraneous light and noting the amount of variation necessary to render negligible the contrast in the projected image.

2. The combination of means for supporting a negative to be measured, means for forming an image of the negative on a screen, means for directing non-image bearing light through said negative onto the image on the screen, means for varying the intensity of the non-image bearing light, and indicating means connected to said varying means.

3. Apparatus of the character described comprising means for supporting a photographic negative, a screen, a lamp for illuminating the negative, an objective for imaging the negative on the screen, and a condenser lens in front of and near to the negative for imaging the lamp in the objective, an auxiliary lamp and a lamp for directing a secondary beam of light through the negative at an angle to the primary beam, deflecting means for directing said secondary beam onto said screen and light varying means between said auxiliary lamp and said negative.

CLIFTON M. TUTTLE.